United States Patent [19]

Fairchok et al.

[11] Patent Number: 4,741,970

[45] Date of Patent: May 3, 1988

[54] THERMOPLASTIC LAMINATE TIE LAYER USING A POLYMERIC BLEND ADHESIVE

[75] Inventors: William J. Fairchok, Saginaw; Thomas O. Ginter, Sanford; Bruce P. Thill; Thomas T. Chiu, both of Midland, all of Mich.

[73] Assignee: The Dow Chemical Company, Midland, Mich.

[21] Appl. No.: 2,592

[22] Filed: Jan. 12, 1987

Related U.S. Application Data

[60] Division of Ser. No. 819,318, Jan. 16, 1986, abandoned, which is a continuation-in-part of Ser. No. 645,647, Aug. 30, 1984, abandoned.

[51] Int. Cl.$^4$ .................. B32B 27/08; B32B 27/36
[52] U.S. Cl. ......................... 428/516; 428/518; 428/35; 525/66; 264/176.1
[58] Field of Search ............................. 428/516, 518

[56] References Cited

U.S. PATENT DOCUMENTS

| | | | |
|---|---|---|---|
| 4,146,590 | 3/1979 | Yamamoto et al. | 528/271 X |
| 4,474,928 | 10/1984 | Hoenig et al. | 428/457 X |
| 4,477,532 | 10/1984 | Schmukler et al. | 428/516 X |
| 4,612,252 | 9/1986 | Sagane et al. | 428/483 X |

Primary Examiner—P. C. Ives

[57] ABSTRACT

A thermoplastic laminate structure consisting of a plurality of layers wherein at least one of the layers is the adhesive polymeric blend. The adhesive polymeric blend comprises a dispersed phase of poly-2-oxazoline and a glycol and a continuous phase of grafted polypropylene. The preferred poly-2-oxazoline is poly-2-ethyl-2-oxazoline and the preferred glycols are polyalkylene glycols. The grafted polypropylene comprises from about 50 to 80 percent by weight of the total polymeric blend. The grafted polypropylene contains from about 0.1 to about 5 percent by weight total polymer of a graft portion derived from an α,β-ethylenically unsaturated carboxylic acid or an unsaturated cyclic anhydride wherein said glycol is in slight excess to the graft, i.e., molar ratio of glycol to graft is 1.1 to about 1.5:1.

9 Claims, No Drawings

THERMOPLASTIC LAMINATE TIE LAYER USING A POLYMERIC BLEND ADHESIVE

CROSS-REFERENCE TO RELATED APPLICATION

This is a divisional of application Ser. No. 819,318, filed Jan. 16, 1986, now abandoned, which is a continuation-in-part of application Ser. No. 645,647, filed Aug. 30, 1984, now abandoned.

BACKGROUND OF THE INVENTION

This invention relates to an adhesive composition useful in the preparation of multilayered laminates. The adhesive is particularly useful in adhering dissimilar materials such as barrier layer to a polyolefin layer for forming durable, moldable articles which resist delamination.

The preparation of rigid or semi-rigid polymeric containers that can be handled and processed similar to metal cans or glass jars has long been sought for economic reasons and for the general improvement of packaging. Therefore, it has been desirable to replace the use of metal or glass with more durable and light packaging materials. Laminates of various polymeric materials are preferred to package goods because they provide flexibility in choosing what properties each portion of the container will have. For example, the inner surface of a container should provide a surface which will not contaminate the packaged goods while securely containing them. The interior of the container should prevent the passage of gases and vapor, i.e., comprise a barrier layer, and the exterior of the container should provide structural support for the container and resist breakage. Finally the entire laminate should be uniformly moldable such that the various properties contributed by the polymeric layers are consistent throughout the container.

Problems associated with laminates generally, be they sheet or film structures, involve adhering the various polymeric layers together such that they will not delaminate when molded or processed. Typically, the conditions which potential laminate containers must undergo aggravate the tendency of dissimilar layers to separate. For instance, the molding process can put great stress on the interface of the polymeric layers due to different tensile and elongation properties of the polymers. Further, the processing requirements, in the processing of food containers, can subject the laminate to retort conditions in order to cook or sterilize the packaged material. It is therefore critical that an excellent adhesive composition be employed to compensate for the difference in the physical and chemical properties of the dissimilar polymeric layers. Various adhesive compositions capable of being molded and processed have been suggested but better systems capable of undergoing even greater stress are still being sought.

One such attempt is disclosed in U.S. Pat. No. 3,673,050 which provides for a five-layer rigid or semi-rigid sheet comprising an inner barrier layer having a glue layer on both sides which is adhered to rigid polyolefin outer layers. The adhesive layer is composed of a copolymer of ethylene and vinyl acetate. Another attempt at forming a multilayered structure which can be coextruded as a film or sheet is disclosed in U.S. Pat. No. 3,908,070. There a nylon resin layer is adhesively bonded to a polyolefin layer to form a barrier to gas and water vapor. The adhesive layer is a copolymer of ethylene and monocarboxylic acids such as acrylic acid or methacrylic acid.

The present invention concerns an improved adhesive composition for adhering laminates comprising a grafted polypropylene, a glycol and a poly-2-oxazoline which provides excellent adhesion and resists delamination under the severe conditions which can occur during the molding of the laminate and processing of the packaged goods. This particular combination has been found to provide both an adhesive and compatibilizing layer between dissimilar polymeric layers.

SUMMARY OF THE INVENTION

In one aspect, the present invention is an adhesive polymeric blend comprising a dispersed phase of poly-2-oxazoline and a glycol and a continuous phase of grafted polypropylene. Preferably, the poly-2-oxazoline is polyethyloxazoline. The glycol portion is structurally depicted as $R'O-(RO)_n-R-OH$, where $R'$ is hydrogen or an alkyl group having from 1 to about 4 carbon atoms, R is an alkyl group having 2 to 4 carbon atoms and n is 0–14. Preferably, the glycol is a polyalkylene glycol such as polypropylene glycol, polyethylene glycol or polybutylene glycol. The grafted polypropylene contains from about 0.1 to about 5 percent by weight total polymer of a graft portion derived from an $\alpha,\beta$-ethylenically unsaturated carboxylic acid or an unsaturated cyclic anhydride and the molar ratio of the glycol to graft is from 1.1 to 1.5:1. Generally, the grafted polypropylene comprises from about 50 to about 80 weight percent of the total polymeric blend. Preferably, the ratio of poly-2-oxazoline to glycol is about 10:1.

In another aspect, the present invention is a thermoplastic laminate structure consisting of a plurality of layers characterized in that at least one of said layers is the adhesive polymeric blend as described above. Generally, the laminate structure comprises an inner gas and moisture barrier layer, juxtaposed layers of the adhesive polymeric blend on each side of the barrier layer and outer layers of a rigid or semi-rigid thermoplastic material. The barrier layer can be a copolymer of vinylidene chloride and one or more unsaturated monomers, preferably SARAN type vinylidene chloride copolymers. The rigid or semi-rigid outer layers can be polypropylene.

Among the advantages of the subject adhesive polymeric blend is that it is an excellent compatibilizer between polymeric layers of different moduli and acts to effectively adhere them. This characteristic allows laminate prepared with the adhesive blend to be molded without thinning out and delaminating. The subject adhesive is especially well suited for adhering saran to polypropylene which can be manufactured into containers or films.

DETAILED DESCRIPTION OF THE INVENTION

The adhesive polymeric blend of the subject invention provides an improved adhesive characteristic. This improvement in adhesion is due to the particular components which are employed in the blend. The adhesive polymer blend is especially valuable as a tie layer between dissimilar layers of polymeric material as well as similar layers.

In one aspect, the tie layer is a very effective adhesive for thermoplastic laminate structures made from a high density polyolefin sheet such as polypropylene and a gas and moisture barrier layer such as a copolymer of vinylidene chloride and one or more unsaturated monomers. The excellent adhesive characteristic of the subject adhesive polymeric blend, tie layer, to the barrier layer is believed to be contributed by migration between the adhesive and barrier layer materials. Other barrier layers, such as hydrolyzed ethylene vinyl acetate, which are operable with the subject adhesive are also deemed to be within the scope of this invention.

The three major components of the adhesive polymeric blend are (1) poly-2-oxazoline, (2) a glycol compound and (3) a grafted polypropylene. The grafted polypropylene is the major component or continuous phase and the poly-2-oxazoline and glycol compound are the minor components or dispersed phase of the blend.

The poly-2-oxazoline compounds used herein are compounds consisting of n randomly-joined units (I, II) and are readily prepared by the ring-opening polymerization of 2-oxazolines or like compounds (III).

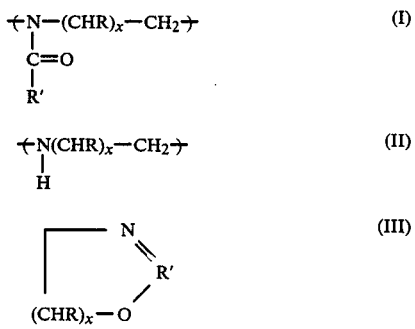

The substituents and subscripts are hereinafter defined. The ring-opening polymerization of 2-oxazoline monomers is generally conducted in the presence of a cationic polymerization catalyst at a reaction temperature of about 0°–200° C. Typical catalysts include strong mineral acids, organic sulfonic acids and their esters, acidic salts such as ammonium sulfate, Lewis acids such as aluminum trichloride, stannous tetrachloride, boron trifluoride and organic diazoniumfluoroborates, dialkyl sulfates and other like catalysts. This ring-opening polymerization is further described by Tomalia et al., *J. Polymer Science*, 4, 2253 (1966); Bassiri et al., *Polymer Letters*, 5, 871 (1967); Seeliger, Ger. 1,206,585; Jones and Roth, U.S. Pat. No. 3,640,909; and Litt et al., U.S. Pat. No. 3,483,141.

The pre-hydrolyzed polymer thereby obtained are linear, N-acylpolyalkylenimines having a molecular structure consisting essentially of repeating units (I). These polymers can be used as such or the partially hydrolyzed form. These polymers are easily hydrolyzed (deacylated) by contact with a strong acid, such as HCl, followed by contact with a base, such as NaOH. This process is further described by K. M. Kem, *J. Polymer Science*, 17, 1977 (1979). The partially hydrolyzed polyoxazolines, have a molecular structure consisting essentially of the randomly-joined units (I) and (II), illustratively depicted as:

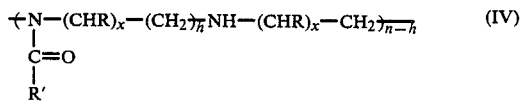

wherein: n is the total number of units or degree of polymerization; h is the number of acylated units; and n-h is the number of hydrolyzed units. In the present invention, n-h is within the range of from zero to about 50 percent of n. In the above formulae, R is typically hydrogen or $C_1$–$C_3$ alkyl; R' is typically hydrogen, phenyl or alkyl having up to about 18 carbon atoms or an inertly-substituted derivative thereof; and x is 1 or 2. As used herein, "2-oxazoline" includes both poly-2-oxazoline monomers, i.e., x is 1 and 2-oxazine monomers, i.e., x is 2, and "poly-2-oxazoline" includes both poly-2-oxazoline polymers and poly-2-oxazine polymers. By such terms as "inertly-substituted" is meant that the substituents do not preclude the polymerization of the 2-oxazoline monomers. Illustrative inert substituents include halogen, alkenyl hydrocarbons, alkoxy, ester, etc. Exemplary R substituents include hydrogen, methyl, ethyl and propyl and exemplary R' substituents include hydrogen, methyl, ethyl, propyl, pentyl, cyclohexyl, dodecyl, octadecyl, and the various halogenated, ethylenically unsaturated, etc., derivatives of each such as poly(2-trichloromethyl-2-oxazoline), poly(2-isopropenyl-2-oxazoline), etc.

Typically, the poly-2-oxazoline has a molecular weight within the range of 1,000 to 1,000,000. In the present invention, it is preferable to use a poly-2-oxazoline having a molecular weight within the range of about 100,000 to about 600,000. A preferred poly-2-oxazoline is poly-2-ethyl-2-oxazoline (hereinafter "polyethyloxazoline" or "PEOx").

The glycol compounds or blends thereof are compounds which can be structurally characterized by the formula

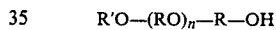

wherein R is an alkyl group having 2 to 4 carbon atoms, R' is hydrogen or an alkyl group of from 1 to about 4 carbon atoms and n is 0–14. The preferred glycol compounds or blends thereof are polyalkylene glycols which are reactive with the carboxyl or anhydride groups of the grafted polypropylene and are miscible with the poly-2-oxazoline. The preferred polyalkylene glycols are polypropylene glycol, polyethylene glycol, and polybutylene glycol.

The grafted polypropylene compounds employed herein are compounds consisting of a polymer of propylene grafted with an anhydride or carboxylic acid. Generally, the graft is from about 0.1 to about 5 percent, preferably from about 0.5 to about 3 percent by weight of the total polymer. Grafted polypropylenes found to be useful are those with $\alpha,\beta$,ethylenically unsaturated carboxylic acid grafts and unsaturated cyclic anhydride grafts. Processes for preparing grafted polypropylene are described by Steinkamp et al. in U.S. Pat. Nos. 3,953,655 and 3,862,265.

Generally, the grafted polypropylene compounds are commercially available through various manufacturers such as Admer ® QF500, tradename of the Mitsui Petrochemical Industries, Ltd. for a cyclic anhydride grafted polypropylene and Reichhold ® 1001, trademark of Reichhold Chemical Company for acrylic acid grafted polypropylene. These, as well as other grafted polypropylenes can be advantageously employed. It is of course recognized that the grafted polypropylenes may contain minor amounts of other polyolefins. Most commonly the grafted polypropylenes are blended with minor amounts, i.e., less than about 25 percent by weight of the total polymer, of polyolefin materials such as linear low density polyethylene or ethylene-propylene copolymer.

Among the benefits of the present invention is the superior adhesive characteristic over blends not containing the three components described above. For example, blends not containing grafted polypropylene, i.e. ungrafted polypropylene, were attempted and; although they exhibited adhesive properties, they were not as effective in adhering polyolefin laminates as the present invention. It has been shown by infrared spectroscopy that the graft present on the polypropylene reacts with the glycol to form a glycol ester graft. It is believed that the glycol ester graft assists to compatibilize the polypropylene and polyoxazoline polymers.

Due to the beneficial interaction between the glycol component and the graft present on the polypropylene, it is necessary to insure that the glycol ester graft is formed. Therefore, a slight molar excess of glycol is employed with respect to the graft present on the polypropylene. Generally, the molar ratio of glycol to the graft which is either a carboxyl or anhydride group as described above is 1.1 to about 1.5:1. This ratio must be followed because greater amounts of glycol would excessively dilute the poly-2-oxazoline component and inhibit its ability to enhance the adhesion of the subject adhesive. Whereas, lesser amounts of glycol would not effectively plasticize the poly-2-oxazoline and again inhibit the poly-2-oxazoline from enhancing the adhesion of the subject adhesive.

In the preparation of the adhesive polymeric blend, the molar ratio of poly-2-oxazoline to glycol is generally present from about 20:1 to 5:1, respectively. More preferably, the molar ratio is about 10:1 of poly-2-oxazoline to glycol.

Generally, the subject adhesive polymeric blend is prepared by blending the poly-2-oxazoline, and glycol with a major portion of grafted polypropylene such that a continuous phase of grafted polypropylene exists. That is, the poly-2-oxazoline and glycol components are present in the blend as a dispersed phase. The grafted polypropylene component of the adhesive polymeric blend is the major component and comprises from about 50 to about 80 percent by weight of the total polymeric blend with the remainder being the admixture of glycol and poly-2-oxazoline. More preferably, the grafted polypropylene comprises from about 55 to about 75 percent by weight of the total polymeric blend.

The three subject components can be physically blended in a manner which provides intimate contact such as is known in the art of polymer compounding but which are not degradative to the individual components. For example, the subject components can be blended in a Brabender mixer, on a mill, or combined in an extruder. The temperature of mixing is not particularly critical as long as the individual components are not scorched. Scorch is a phenomenon well recognized in the art of polymer compounding wherein a polymer mixture becomes tough and unworkable due to precuring or burning.

The adhesive polymeric blend may be pelletized and extruded. Preferably the pelletized blend is coextruded as a tie layer in the form of a laminate structure. The laminate structure can comprise a plurality of independent layers, at least some of which are bonded by the subject tie layer-adhesive composition. In another aspect, the subject tie layer can be an exterior layer or a single sheet which can be utilized at a later period as an adhesive or tie layer. In a more preferred embodiment, a five-layer laminate structure can be prepared as is disclosed in U.S. Pat. No. 3,673,050, herein incorporated by reference, wherein the glue layer is instead the adhesive polymeric blend of the subject invention. More particularly, the laminate structure is a five-layer rigid or semi-rigid sheet comprising outer skin layers of a high density polyolefin and juxtaposed glue layers of the subject adhesive on both sides of a barrier layer of vinylidene chloride copolymer. Other suitable methods for preparing multilayered thermoplastic structures with the subject adhesive should be readily apparent to the skilled artisan and are deemed to be within the scope of this invention. The methods disclosed in U.S. Pat. No. 3,908,070 are such examples.

The adhesive polymeric blend of the subject invention has been found to be compatible in most coextrusion equipment. In particular, it has been found to perform well in the coextrusion with films of vinylidene chloride polymers and one or more unsaturated monomers, e.g., SARAN type vinylidene chloride copolymers. The adhesive properties of the subject polymeric blend have further been found to be effective over a broad temperature range which encompasses typical storage and processing temperatures of packaging containers. That is, from about 0° to about 176° C. Thus, the multilayered containers made with the adhesive of the invention are easily hot filled, retorted and are able to withstand drop tests and disfiguration tests without delamination.

The various advantages and applications of the subject adhesive are demonstrated in the following examples and data which are presented as a further explanation but are not intended as limitations to the invention.

EXAMPLE I

Preparation of Adhesive Polymeric Blend

In a Brabender mixer at from about 190° to about 205° C. was added nine parts by weight of high molecular weight (~500,000) polyethyloxazoline and one part by weight polypropylene glycol (mol. wt. ~425). The resulting product was cooled and ground in a mill with a 6 mm screen. To 32 parts by weight of the polypropylene glycol/polyethyloxazoline blend was dry blended 68 parts by weight of Admer ® QF500, trademark of the Mitsui Petrochemical Industries Ltd. for grafted polypropylene (~85 weight percent polypropylene with an ~one weight percent cyclic anhydride graft blend with ~15 weight percent of a copolymer of 1-butene/ethylene). The resulting blend was then formed into a strand, cooled in a water bath, and cut into pellets. The pellets were dried in an oven at 80° C. for 24 hours.

An infrared spectroscopy analysis of the blend indicated that the anhydride present in the grafted polypropylene reacts with the polyglycol to form a glycol ester graft. The reaction can be generally depicted as follows (R is $C_3$).

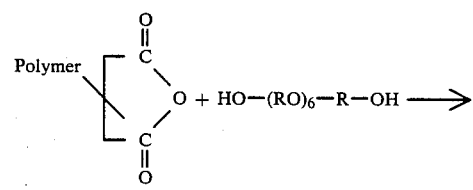

-continued

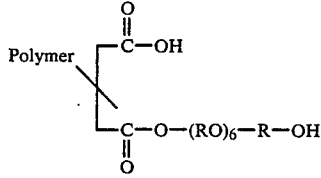

EXAMPLE II

An adhesive polymeric blend was prepared exactly as in Example I except that the grafted polypropylene component was Reichhold® 1001, a trademark of Reichhold Chemical Co. for acrylic acid grafted polypropylene.

EXAMPLE III

Five-Layer Laminate Sheet

The glue pellets of Example I, the subject adhesive, were coextruded with polypropylene and vinylidene chloride into a five-layer laminate as follows: a 112 mils thick sheet of polypropylene, a 2.5 mils thick sheet of the subject adhesive, a 22 mils thick sheet of vinylidene chloride, a 2.5 mils thick sheet of the subject adhesive, and 112 mils thick sheet of polypropylene. Typical coextrusion processes applicable to this invention are disclosed in U.S. Pat. Nos. 3,223,761; 3,479,425; 3,557,265 and 3,833,704. The coextruded sheet was cut into squares, 6.22 cm on a side, and fed into a scrapless forming mechanism. The scrapless forming process (SFP) is disclosed in U.S. Pat. No. 3,739,052 and generally entails a process for rapidly making thermoplastic containers. A blank of laminate thermoplastics was lubricated, solid phase heated and forged into a desired shape preformed with a predetermined lip configuration. The preform was then thermoformed into a container having a desired shape and size, and cooled.

A coextruded laminate sheet cut into blanks was also prepared as above with the glue pellets from Example II.

The adhesion level of the subject adhesive was measured for the two laminates prepared in Example III. To test for an improvement a similar laminate was prepared employing ethylene vinyl acetate (EVA) adhesive layer which is a commonly used adhesive. The results were as follows:

| Adhesive Layer | 90° Peel Strength of Laminate (g/cm width) |
|---|---|
| Example I | ~1610 |
| Example II | ~880 |
| EVA (control) | ~540 |

Both adhesives from Examples I and II showed marked improvement over the EVA adhesive. The improvement in adhesion for the Example I adhesive composition was approximately three fold over the traditional EVA adhesive. Further, the subject adhesives extruded well and did not become hazy as the, control, EVA adhesive tie layer did when exposed to boiling water for one hour.

EXAMPLE IV

Preparation of Adhesive Polymeric Blend with Ethylene Glycol

In a Brabender mixer preheated to 200° C. was added 48 g of a dry polymer blend containing 30 g of Admer® QF500, trademark of the Mitsui Petrochemical Industries, Ltd., for grafted polypropylene (see, Example I for chemical structure) and 18 g of polyethyloxazoline. After mixing for 1 minute at 50 rpm a 2 cc aliquot of ethylene glycol was added by syringe. the blend was mixed for an additional 5 minutes and then the blend was collected and cooled. The blend was chopped and passed through a 16 mesh screen.

The adhesive blend as prepared above was employed to prepare a 5 layer laminate of polypropylene/adhesive/SARAN type vinylidene chloride copolymer/adhesive/polypropylene similar to that prepared in Examples 1 and II. A 90° peel strength was then performed on the laminate which showed ~1790 g/cm width.

What is claimed is:

1. A thermoplastic laminate structure consisting of a plurality of layers wherein at least one of said layers is an adhesive polymeric blend comprising:
   a dispersed phase of
   (a) poly-2-oxazoline, and
   (b) a glycol wherein the molar ratio of said poly-2-oxazoline to said glycol is from about 20:1 to about 5:1; and
   a continuous phase of
   (c) grafted polypropylene wherein a graft is derived from an α,β-ethylenically unsaturated carboxylic acid or an unsaturated cyclic anhydride and is from about 0.1 to about 5 percent by weight of the total polymer and wherein the molar ratio of said glycol to said graft is from 1.1 to about 1.5:1;
   wherein said laminate comprises an inner gas and moisture barrier layer, juxtaposed layers of said adhesive polymeric blend on each side of said barrier layer and outer layers of a rigid or semi-rigid thermoplastic material and wherein said barrier layer is a copolymer of vinylidene chloride and one or more other unsaturated monomers and wherein said outer layers are polypropylene.

2. The thermoplastic laminate structure of claim 1 wherein said poly-2-oxazoline is poly-2-ethyl-2-oxazoline.

3. The thermoplastic laminate structure of claim 1 wherein said glycol is structurally depicted as

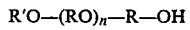

wherein R is an alkyl group having 2 to 4 carbon atoms, R' is hydrogen or an alkyl group of from 1 to about 4 carbon atoms, and n is 0-14.

4. The thermoplastic laminate structure of claim 3 where said glycol is a polyalkylene glycol.

5. The thermoplastic laminate structure of claim 4 wherein said polyalkylene glycol is polypropylene glycol, polyethylene glycol or polybutylene glycol.

6. The thermoplastic laminate structure of claim 1 wherein the graft portion of said grafted polypropylene is from about 0.5 to about 3 percent by weight of the total polymer.

7. The thermoplastic laminate structure of claim 1 where said grafted polypropylene is a blend comprising less than about 25 percent by weight of the total polymer of a polyolefin.

8. The thermoplastic laminate structure of claim 1 wherein the ratio of said poly-2-oxazoline to said glycol is about 10:1, respectively.

9. The thermoplastic laminate structure of claim 1 wherein said grafted polypropylene comprises from about 50 to about 80 percent by weight of the total polymeric blend.

* * * * *